June 21, 1960 D. J. KLEE 2,942,139
MOTOR DRIVE CONTROL CIRCUIT
Filed Sept. 21, 1959
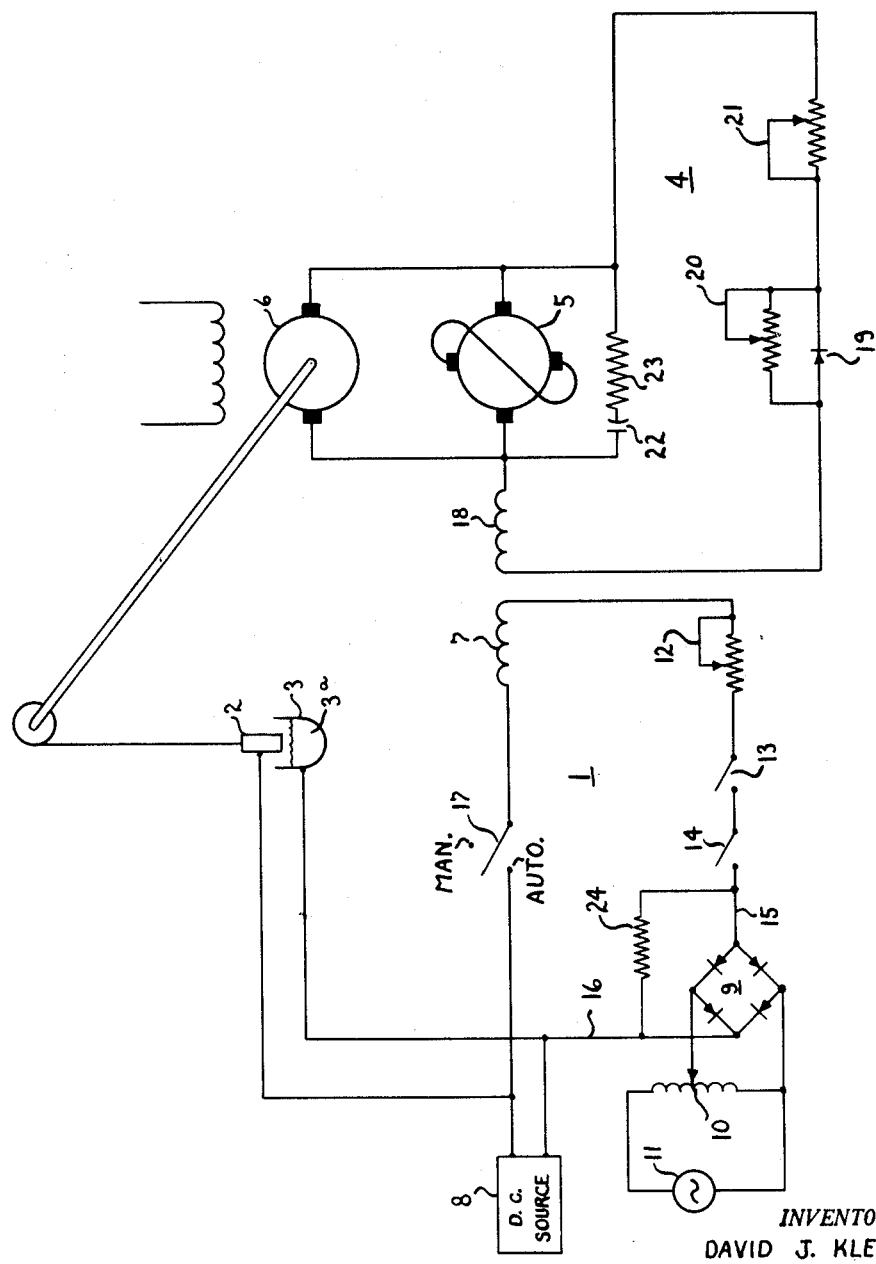
INVENTOR.
DAVID J. KLEE
BY Vernon N. Kall
ATTORNEY 2,942,139

MOTOR DRIVE CONTROL CIRCUIT

David J. Klee, Shelbyville, Ind., assignor to General Electric Company, a corporation of New York Filed Sept. 21, 1959, Ser. No. 841,296

7 Claims. (Cl. 314—69)

The present invention relates to electric motor drive control circuits and more particularly to electric motor drive control circuits for the electrode drive of a consumable electrode type electric arc furnace.

In numerous types of electric motor drive control circuits it is necessary to provide means for frequently reversing the direction of rotation of a drive motor. A common means of providing such a reversible drive control is to utilize a reversible direct current motor that is energized by an amplidyne. In such an arrangement, the polarity of the output voltage of the amplidyne, and consequently the direction of rotation of the D.C. motor, is reversed when the direction of current through the quadrature field of the amplidyne is reversed. Such amplidyne-supplied drive motor control circuits are commonly used in the electrode drive control circuits of consumable electrode type electric arc furnaces.

In an electric arc furnace of the consumable electrode type the heat for the furnace is provided by an electric arc between a molten pool of metal, that serves as one electrode for the arc, and a second electrode that is movable relative to the molten pool of metal. The second electrode is consumed by the heat of the arc, so for proper operation of such a furnace, which, among other things, requires a constant arc voltage to be applied between the two electrodes, the position of the second electrode must be adjusted relative to the molten pool to compensate for the consumption of the electrode.

One known method of providing accurate automatic control of electrode movement in such an amplidyne-energized electrode drive control circuit is to connect amplidyne field energizing means that are responsive to variations in the arc voltage to the quadrature field of the amplidyne. This type of electrode drive control circuit arrangement serves to energize the quadrature field of the amplidyne in a direction such that when the arc voltage rises above a predetermined level the two electrodes are driven toward one another, while if the arc voltage falls below a predetermined level the two electrodes are driven apart. Such an electrode drive control circuit is generally satisfactory for normal furnace operation; however, if voltage variations of relatively large magnitude suddenly occur in the arc voltage, the amplidyne generates a voltage that causes the D.C. motor to move the electrode so rapidly that over-correction of the system may result. For example, when such an electrode drive control circuit is placed in operation, the current through the amplidyne quadrature field is a function of the voltage differential between a fixed reference voltage and the electrode arc voltage. To initiate an arc between the two electrodes when the electrode drive control circuit is first placed in operation, it is common practice in the art to manually position the movable electrode a suitable distance above the metal forming the second electrode and then allow the electrode drive control circuit to drive the movable electrode toward the metal until contact is made between these two electrodes. When the two electrodes engage, the current passing through the quadrature field of the amplidyne is suddenly reversed and the drive motor is energized by the amplidyne to rapidly draw the movable electrode away from the molten pool and establish an arc between the two electrodes.

While the relatively fast response time of the type of amplidyne utilized in electrode drive control circuits makes it possible to successfully establish an arc between the electrodes of an electric arc furnace in the above mentioned manner, manufacturers have been faced with the problem of regulating this rapid response type of system so that the rate of response in an electrode raising cycle is not allowed to become so excessive that the electrode is overdriven when variations of large magnitude suddenly occur in the arc voltage. Similarly in the electrode lowering direction it is necessary to provide means for regulating the rate at which the electrode is fed toward the contents of the crucible, thereby to accurately control the space between the electrode and the contents of the crucible. A solution to both of these problems is provided by my invention which affords means for accurately regulating the rate of response of an electrode drive control system in both an electrode-raising and an electrode-lowering cycle. In particular, I provide a feedback type of control which includes means for adjusting the rate of movement of the electrode in a raising cycle to a given rate while also providing separate control means for adjusting the rate of movement of the electrode in a lowering cycle to a different rate. By thus regulating the drive control system it is possible to control the system so that it automatically raises the electrode at a sufficiently rapid rate to afford automatic arc starting without excessive overcorrection, while at the same time affording regulation of the rate of electrode movement during an electrode-lowering cycle.

Accordingly, it is a specific object of my invention to provide in an automatic electrode drive control system of the type which is responsive to relative movement between the two electrodes of an arc furnace an improved control circuit that prevents the system from raising the electrode at an undesirably rapid rate such that it would be driven to an undesirable position when a rapid variation in arc voltage occurs, while also providing means for regulating the electrode lowering cycle so the rate of movement of the electrode during this cycle can be separately adjusted to a rate different from the rate of movement during a raising cycle.

It is another object of my invention to provide, in a control system of the type just described, an improved circuit for continuously monitoring the drive motor energizing voltage of such a system and for counteracting variations in the drive motor energizing voltage.

It is a further object of my invention to provide, in an automatic electrode drive control system, an amplidyne output voltage regulating circuit having means responsive to variations in the amplidyne output voltage for automatically counteracting such variations whereby the rate of change in amplidyne output voltage is reduced.

It is an additional object of my invention to provide, in an automatic electrode drive control system, an amplidyne control circuit having means responsive to variations in the output voltage of the amplidyne for counteracting such variations, whereby the rate of change of output voltage of the amplidyne is subjected to a first magnitude of counteraction when the output voltage is of one polarity and the rate of change of the output voltage is subjected to a second magnitude of counteraction when the output voltage polarity is reversed.

Further objects and advantages of my invention will become apparent as the following description proceeds and the features of novelty which characterize my invention will be pointed out with particularly in the claims annexed to and forming a part of this specification.

In carrying out the objects of my invention in one form thereof, there is provided a basic automatic control circuit for an electrode drive, which is known in the art and which generally comprises an amplidyne, the armature of which is connected to a reversible direct current motor which in turn is drivingly coupled to one of a pair of electrodes. The quadrature field current of the amplidyne is responsive to variations between a fixed reference voltage and an arc voltage between the pair of electrodes so that when the reference voltage is higher than the arc voltage the motor will be energized by the amplidyne to effect separation of the electrodes, while if the arc voltage is higher than the reference voltage, the motor will drive the electrodes toward one another.

To the basic electrode drive control circuit is added a feedback circuit, which monitors the output voltage of the amplidyne, and comprises an auxiliary control field of the amplidyne connected in series with a rectifier and a variable resistor. In addition to these series connected components, a second variable resistor is connected in parallel with the rectifier. The auxiliary amplidyne field is physically mounted on the amplidyne so that it will counteract the effect of the amplidyne quadrature field when energized. In operation, when the polarity of the amplidyne output voltage is such that the rectifier blocks current, the auxiliary field is energized through both of the variable resistors, whereas when the polarity of the armature voltage is reversed the rectifier shunts one of the resistors so only the remaining resistor limits current through the auxiliary field. By adjusting the settings of the two resistors it is possible to regulate the rate of movement of the electrode in both an electrode raising and an electrode lowering cycle so that the rate in either direction can be set at any value within a given range, and this value is independent of the rate of movement of the electrode in the opposite direction.

For a complete understanding of the invention, together with objects and advantages thereof, reference is made to the following description, taken in conjunction with the accompanying drawing which is a schematic diagram illustrating the application of my invention to regulate a basic electrode drive control circuit for an electric arc furnace.

With reference to the drawing, I have shown a basic type of electrode drive control circuit 1 for effecting relative movement between an electrode 2 and the contents 3a in crucible 3. In addition to the basic electrode drive control circuit, I have shown a feedback circuit 4 electrically connected across the armature of amplidyne 5. The feedback circuit 4 continuously monitors the output voltage of amplidyne 5 and operates to strongly counteract any change in this output voltage when the output voltage is of a first polarity, while affecting the rate of change of the output voltage to a much lesser extent when the polarity thereof is reversed.

The illustrated electrode drive control circuit 1 comprises a direct current motor 6 drivingly coupled to electrode 2 and energized by the amplidyne 5. The amplidyne quadrature control field 7, which determines the polarity of the output voltage of amplidyne 5 and consequently the direction of rotation of motor 6, is energized by both a direct current source 8 and the output of a bridge rectifier 9. The input terminals of rectifier 9 are supplied through an autotransformer 10 from an alternating current source 11 of reference voltage. The relative magnitudes of the reference voltage, as adjusted by autotransformer 10, and the voltage of the direct current source 8 determine the direction of current through amplidyne field 7. In addition to the foregoing circuit components, the basic electrode drive control circuit 1 comprises means for electrically connecting one side of amplidyne control field 7 through a variable resistor 12, a pair of series-connected, normally-closed electrode movement limit switches 13 and 14, a line 15, rectifier 9, and a line 16 to one side of the direct current source 8. A resistor 24 of suitable value is inserted across the output terminals of bridge rectifier 9 to stabilize its output. The other side of the amplidyne control field 7 is connected through automatic-manual switch 17 to the opposite side of direct current source 8. Direct current source 8, in addition to supplying control field 7, provides the arc supply voltage to form an arc between electrode 2 and the contents of crucible 3.

In operation, the autotransformer 10 is adjusted to provide a desired reference voltage that is commensurate with a predetermined spacing between electrode 2 and the contents 3a of crucible 3. After the circuit is thus oriented, if the arc voltage becomes larger than the reference voltage, current through the amplidyne field 7 will be in a direction to effect energization of the motor 6 in an electrode lowering direction. Conversely, if the arc voltage is lower than the reference voltage, current will flow through the field 7 in the opposite direction to effect raising of the electrode 2. Thus, an automatic adjustment of the electrode position is provided in response to a differential between the arc voltage and a predetermined reference voltage.

The feedback circuit 4 prevents the amplidyne 5 from transmitting an unnecessarily large current to the electrode drive control system when the electrode 2 is shorted to the contents 3a of crucible 3; while at the same time allowing electrode 2 to be withdrawn at a rate sufficient to prevent welding of electrode 2 to the contents 3a of crucible 3. During an electrode lowering cycle the feedback circuit 4 affords means for regulating the rate at which the electrode 2 moves towards the contents 3a of crucible 3. To accomplish these functions, feedback circuit 4 is connected to continuously monitor the output voltage of amplidyne 5 and adjusted to strongly counteract variations therein when the output voltage has a first polarity, while also being adjusted to affect the output voltage to a lesser extent when the polarity thereof is reversed. The feedback circuit 4 comprises an auxiliary amplidyne field 18 arranged in series with a unidirectional current passing means, shown as a rectifier 19, across the armature of amplidyne 5, a variable resistor 20 connected in parallel across rectifier 19, and a variable resistor 21 arranged in series with field 18 and rectifier 19. This circuit arrangement causes the auxiliary amplidyne field 18 to be energized by a current of large magnitude when the output voltage of amplidyne 5 is of one polarity such that rectifier 19 conducts and shunts resistor 20 so only resistor 21 limits current through field 18. The field 18 is energized by a current of much smaller magnitude when the output voltage of amplidyne 5 is zero or of the opposite polarity so the rectifier is non-conductive and both resistor 20 and resistor 21 limit current through field 18. It will thus be understood that by separately adjusting resistors 20 and 21 it is possible to adjust the rate of movement of the electrode during a raising cycle to a value different than the rate of movement in a lowering cycle, and each of these rates of movement can be set at a value independent of the rate of movement in the opposite direction. Auxiliary amplidyne field 18 is physically mounted on the amplidyne so that, when energized, field 18 counteracts the effect of quadrature field 7 and reduces the output voltage of amplidyne 5.

In order to prevent large surges of current through the feedback circuit 4, such as might occur when the polarity of the voltage on the auxiliary amplidyne field 18 is reversed, due to the inductive characteristics of field 18, a capacitor 22 and series-connected resistor 23 are placed across feedback circuit 4.

The polarity of rectifier 19, as it is connected in feedback circuit 4, is such that current passes through the rectifier 19 only when the polarity of the output voltage of amplidyne 5 is effective to actuate motor 6 to drive electrode 2 away from crucible 3. Therefore, the current through auxiliary field 18 will only reach a large magnitude to counteract the energizing effect of quadrature field 7 when electrode 2 is being driven away from crucible 3 and rectifier 19 conducts to shunt current-limiting resistor 20 so only resistor 21 limits current through field 18. The effect of quadrature field 7 on the output voltage of amplidyne 5 will be counteracted by field 18 to a much lesser extent when the polarity of the output voltage of amplidyne 5 is such that motor 6 drives electrode 2 toward crucible 3, because rectifier 19 is then non-conductive and the magnitude of current through field 18 is limited by both resistor 20 and resistor 21. It is apparent that by adjusting the settings of resistors 20 and 21 it is possible to regulate the relative magnitudes of current that will flow through field 18 during both an electrode-raising and an electrode-lowering cycle. I have found that by adjusting resistors 20 and 21 so the ratio of feedback between an electrode-raising and an electrode-lowering cycle is about three to one, the response time of the system is sufficiently rapid in both directions of electrode movement, and the system is protected from overdriving during both electrode-raising and electrode-lowering cycles.

During normal operation of the arc furnace, the predominant direction of movement of electrode 2 is toward crucible 3, and the rate of this movement is commensurate with the rate of consumption of electrode 2. It will be understood that during such normal operation, frequent momentary reversals in the direction of movement of electrode 2 may occur and, due to the damping effects of auxiliary field 18 when thus strongly energized, the rate of movement of electrode 2 in a reverse direction during these intervals will be reduced with respect to its rate of movement in a direction toward the crucible. Such a reduction in the amplidyne response time or rate of movement of electrode 2 in an electrode-raising direction is undesirable if it becomes exaggerated, because such operation tends to cause the electrode 2 to weld to the contents 3a of the crucible 3. In order to provide an acceptably rapid withdrawal of electrode 2 from crucible 3 during normal furnace operation, while at the same time limiting corrective action of the system when electrode 2 is electrically shorted to the contents 3a of crucible 3 during a starting cycle, the setting of variable resistor 21 is adjusted, as point out above, to place a sufficiently high value of resistance in series with the auxiliary field 18 to prevent minor variations in the output voltage of amplidyne 5 from causing an appreciable energization of auxiliary field 18.

The operation of the basic electrode drive circuit 1 and the feedback circuit 4 is as follows: To initiate operation of the electrode drive control circuit to effect a melting operation in the crucible 3, switch 17 is placed in its "Man" position and power sources 8 and 11 are energized. Switch 17 is then moved to its "Auto" position which, since the electrode 2 is out of contact with the contents 3a of crucible 3 and an arc has not been initiated, will cause current through amplidyne quadrature field 7 in a direction such that the amplidyne 5 energizes the drive motor 6 to lower electrode 2 toward crucible 3. Electrode 2 will be driven toward crucible 3 until it contacts the contents 3a of the crucible 3, because, until this occurs, no arc is formed between electrode 2 and the contents 3a of crucible 3. The voltage between electrode 2 and the contents 3a of crucible 3 is much higher than the reference voltage of source 11 prior to the formation of such an arc. When electrode 2 contacts the contents 3a of crucible 3, the arc voltage drops to zero, and the motor 6 is suddenly reversed due to the reversal of current through amplidyne quadrature field 7. Simultaneously, due to the reversal in polarity of the output voltage of amplidyne 5, a current of relatively large magnitude passes through rectifier 19 and auxiliary amplidyne field 18 of feedback circuit 4. When the electrode 2 is shorted to the contents 3a of crucible 3, current through quadrature field 7 of amplidyne 5 is a direct function of the magnitude of reference voltage 11; therefore, a relatively large current is passed through quadrature field 7, thus energizing amplidyne 5 to cause it to generate a relatively large output voltage. This large output voltage tends to drive motor 6 rapidly to raise electrode 2 away from the contents 3a of crucible 3; however, due to the fact that auxiliary amplidyne field 18 is also energized by this large output voltage, limited only by resistor 21, the effect of quadrature field 7 is immediately strongly counteracted by field 18, thus reducing the output voltage of amplidyne 5 and preventing motor 6 from being driven at a rate which would cause overcorrection of the system as electrode 2 is raised away from the contents 3a of crucible 3.

The rate at which motor 6 raises electrode 2 away from crucible 3 is dependent upon the setting of resistor 21; therefore, this rate can be adjusted so electrode 2 may be raised at any predetermined desirable speed such that the system is not allowed to overcorrect itself. Now, assuming an arc has been successfully established and the electrode drive control circuit is operating in its normal manner to maintain an arc of predetermined length between the contents 3a of crucible 3 and electrode 2, if it is desired to increase the rate of response of the system in an electrode-lowering direction, it is only necessary to increase the value of resistor 20 that is in series with field 18. Thus, it will be apparent that by separately adjusting resistors 20 and 21 the rate of movement in either direction can be set at any value independently of the rate of movement in the opposite direction.

While I have shown and described a particular embodiment of my motor drive control circuit, it will be obvious to those skilled in the art that various modifications may be made in my circuit without departing from my invention in its broader aspects. I, therefore, intend in the following appended claims to encompass all such modifications as fall within the true scope of my invention.

What I claim as new and desire to secure by Letters Patent of the United States is:

1. In an automatic control system for an arc furnace having two relatively movable electrodes, means for providing an arc voltage between said electrodes, means for providing a reference voltage, means for comparing the arc voltage with the reference voltage, control means responsive to the relative magnitudes of the arc voltage and the reference voltage for moving the electrodes toward each other when the arc voltage is greater than the reference voltage and for moving the electrodes away from each other when the arc voltage is lower than the reference voltage, said control means tending to move said electrodes relative to each other at a rate proportional to the difference in the relative magnitudes of the arc voltage and the reference voltage, means responsive to the direction of movement of said electrodes for counteracting the tendency of the control means to move the electrodes at a rate proportional to the difference in the relative magnitudes of the arc voltage and the reference voltage, and means for varying the effectiveness of said direction responsive means whereby the tendency of the control means to move the electrodes at said proportional rate is more strongly counteracted when the electrodes move away from each other than when the electrodes move toward each other.

2. In an automatic control system for an arc furnace having two relatively movable electrodes, means for providing an arc voltage between said electrodes, means for providing a reference voltage, means for comparing the arc voltage with the reference voltage, control means responsive to the difference in the relative magnitudes of the arc voltage and the reference voltage for moving the electrodes toward each other when the arc voltage is greater than the reference voltage and for moving the electrodes away from each other when the arc voltage is lower than the reference voltage, current responsive means for counteracting any variation in the rate of relative movement between said electrodes, and means responsive to a change in the polarity of the voltage across the electrodes for varying the magnitude of current through the current responsive means, thereby to vary the rate of relative movement between the electrodes in response to a reversal of polarity across the electrodes.

3. In an automatic control system for an arc furnace having two relatively movable electrodes, means for providing an arc voltage between said electrodes, means for providing a reference voltage, means for comparing the arc voltage with the reference voltage, control means responsive to the difference in the relative magnitudes of the arc voltage and the reference voltage for moving the electrodes toward each other when the arc voltage is greater than the reference voltage and for moving the electrodes away from each other when the arc voltage is lower than the reference voltage, current responsive means for regulating the rate of movement of the electrodes when energized, unidirectional current passing means, current limiting means electrically connected in parallel with said unidirectional current passing means, means for electrically connecting the current responsive means in series with the unidirectional current passing means across the voltage comparing means whereby the energization of the current responsive means is regulated by the unidirectional current passing means and the current limiting means, thereby to regulate the rate of relative movement between the electrodes to a first level when the voltage across said comparing means is of a polarity such that the unidirectional current passing means co-acts with the current limiting means to reduce the current through said current responsive means, and to a second level when the voltage across said means is of an opposite polarity such that current by-passes the current limiting means through the unidirectional current passing means.

4. In an automatic control system for an arc furnace having two relatively movable electrodes, means for providing an arc voltage between said electrodes, means for providing a reference voltage, means for comparing the arc voltage with the reference voltage, control means responsive to the difference in the relative magnitudes of the arc voltage and the reference voltage for moving the electrodes toward each other when the arc voltage is greater than the reference voltage and for moving the electrodes away from each other when the arc voltage is lower than the reference voltage, current responsive means for regulating the rate of movement of the electrodes when energized, first and second variable impedances, unidirectional current passing means, means for electrically connecting the current responsive means in series with the first variable impedance and the unidirectional current passing means across the voltage comparing means, means for electrically connecting the second variable impedance in parallel with the unidirectional current passing means, whereby the first and second variable impedances limit current through the current responsive means to afford a first rate of relative movement when the polarity of the voltage across the voltage comparing means is such that the unidirectional current passing means is non-conductive, and only the first variable impedance limits current through the current responsive means to afford a second rate of relative movement when the unidirectional current passing means conducts and shunts the second variable impedance.

5. In an automatic control system for an arc furnace having two relatively movable electrodes, means for providing an arc voltage between said electrodes, means for providing a reference voltage, means for comparing the arc voltage with the reference voltage, control means responsive to the difference in the relative magnitude of the arc voltage and the reference voltage for moving the electrodes toward each other when the arc voltage is greater than the reference voltage and for moving the electrodes away from each other when the arc voltage is lower than the reference voltage, current responsive means for regulating the rate of movement of the electrodes when energized, first and second impedances, unidirectional current passing means, means for electrically connecting the current responsive means in series with the first impedance and the unidirectional current passing means across the voltage comparing means, means for electrically connecting the second impedance in parallel with the unidirectional current passing means, whereby the first and second impedances limit current through the current responsive means to afford a first rate of relative movement when the polarity of the voltage across the voltage comparing means is such that the unidirectional current passing means is non-conductive, and only the first impedance limits current through the current responsive means to afford a second rate of relative movement when the unidirectional current passing means conducts and shunts the second impedance.

6. In an automatic control system as defined in claim 5, means for adjusting the values of the first and second impedances independently of each other.

7. In an automatic control system for an arc furnace having two relatively movable electrodes, a direct current motor for driving one of said electrodes, an amplidyne for energizing said motor, said amplidyne being provided with a primary control field and auxiliary control field, said auxiliary control field being physically arranged to counteract the controlling effect of the primary field when energized, unidirectional current passing means, a first variable impedance electrically connected in parallel across the unidirectional current passing means, a second variable impedance, means for electrically connecting the auxiliary field in series with the unidirectional current passing means and said second variable impedance across the armature of the amplidyne whereby the unidirectional current passing means and the first variable impedance and the second variable impedance limit current through the auxiliary field to a first magnitude dependent upon the settings of said first and second variable impedances when the voltage across the amplidyne is of a first polarity such that the unidirectional current passing means is non-conductive, and the second variable impedance limits current through the auxiliary field to a second magnitude when the polarity of the voltage across the amplidyne is reversed so the unidirectional current passing means shunts the first variable impedance, thereby affording means for varying the effectiveness of the counteracting means to regulate the magnitude of the amplidyne armature voltage to two different levels as a function of the polarity of the armature voltage.

No references cited.